United States Patent [19]

Lewis et al.

[11] 4,232,516
[45] Nov. 11, 1980

[54] FLOW DEFLECTING DEVICES

[75] Inventors: William J. Lewis, Winscombe; Leslie R. Harper, Bristol; Malcolm J. Davis, Bristol; Richard G. Gardiner, Bristol, all of England

[73] Assignee: Rolls-Royce Limited, London, England

[21] Appl. No.: 945,505

[22] Filed: Sep. 25, 1978

[30] Foreign Application Priority Data

Oct. 5, 1977 [GB] United Kingdom ............... 41522/77

[51] Int. Cl.³ ................................................ F02K 3/02
[52] U.S. Cl. ............................. 60/226 A; 239/265.31
[58] Field of Search ..................... 60/226 A, 228, 229, 60/230; 138/39; 239/265.29, 265.31; 244/110 B, 199, 204

[56] References Cited

U.S. PATENT DOCUMENTS

| 3,471,107 | 10/1969 | Ornberg | 244/199 |
| 3,524,458 | 8/1970 | Goldsmith | 415/DIG. 1 |
| 4,047,381 | 9/1977 | Smith | 60/226 A |
| 4,098,073 | 7/1978 | Adkins | 138/39 |

FOREIGN PATENT DOCUMENTS

| 2216220 | 10/1972 | Fed. Rep. of Germany | 60/226 A |
| 985776 | 3/1965 | United Kingdom | 415/DIG. 1 |

*Primary Examiner*—Douglas Hart
*Attorney, Agent, or Firm*—Stevens, Davis, Miller & Mosher

[57] ABSTRACT

A translating cowl thrust reverser for a ducted fan gas turbine engine has a fan cowl, the downstream portion of which is translatable axially to open an aperture in the cowl. The aperture has upstream and downstream side-walls and which are curved to deflect fan air flow through the aperture in a forward direction. An annular plate is positioned at the outlet from the aperture and projects into the turbulent flow region on the upstream side-wall to define with the side-wall a recess open to the flow which delays the separation of the flow from the side-wall. This increases the effective area of the outlet and the angle through which the flow is turned thus improving the thrust reverser efficiency to the point at which no cascades are needed in the aperture.

3 Claims, 4 Drawing Figures

FLOW DEFLECTING DEVICES

The present invention relates to gas turbine engine thrust reversers, VTO nozzles and other flow deflecting devices. The invention has particular but not exclusive reference to translating cowl thrust reversers for ducted fan gas turbine engines.

In general all gas turbine engines have at least one gas flow passage between radially inner and outer walls.

In a translating cowl thrust reverser one portion of the radially outer wall of such a passage, which wall may be the fan cowl in a ducted fan gas turbine engine, is translatable axially to open an aperture in the wall, each aperture having an inlet communicating with the gas flow passage and an outlet communicating with atmosphere. The upstream and downstream side-walls of the aperture, which abut when the aperture is closed, are curved to direct any gas flow through the aperture and out of the outlet with the forwardly directed component of velocity. Means are provided which operate in conjunction with the translating wall portion to block the gas flow passage and deflect any gas flowing therein into the inlet of the aperture.

The words forward, rearward, upstream and downstream where used in this specification refer to the general direction of gas flow through the engine.

It is usual in the above-described thrust reversers to provide a cascade of flow-turning vanes in the aperture to assist in turning the flow therethrough to provide the forward component of velocity. Such cascades constitute a weight penalty on the engine and it would be of significant benefit if they could be deleted from the engine without significant loss of thrust reverser efficiency.

The efficiency of a thrust reverser is a function of the angle through which it can turn a gas flow. In a translating cowl thrust reverser the curvatures of the upstream and downstream side-walls are limited by the radial depth of the cowl in the region of the aperture. Where the cowl thickness is relatively small the curvature of the side-walls of the aperture may be so great that the flow through the aperture tends to become separated from the upstream side-wall, which is the inside extremity in relation to the turning flow. This separation of the flow reduces the thrust reverse efficiency because both the forwardly directed component of the flow and the effective outlet area of the aperture are reduced.

Where cascades are used, the flow turning effect of the vanes close to the upstream side-wall or inside extremity of the flow minimizes this loss of efficiency, but in a cascadeless thrust reverser the flow turning effect of the downstream side-wall or outside extremity of the flow wall is too far away from the upstream side-wall to have any significant effect.

One possible solution to the problem is to provide an end plate at the outside extremity of the flow adjacent the aperture outlet, and which extends upstream from the side-wall, or to arrange that the outside side-wall extends axially upstream at the outlet from the aperture. This increases the forward angle of the flow emerging from the outlet but further reduces the effective outlet area.

We have now discovered that a plate at the inside extremity of the flow which extends in a downstream direction from the upstream side-wall into the separated (turbulent) flow adjacent the side-wall, increases the effective area of the aperure outlet by delaying the separation of the flow. This delay of separation in turn causes turning of the flow through a greater angle and produces greater reverse thrust.

Although at first sight it is to be expected that such a plate would even further decrease the outlet area of the aperture, the opposite has been found to be the case. This surprising result enables the thrust reverser performance to be increased to the extent that a satisfactory thrust reverse efficiency can be obtained in a cascadeless translating cowl thrust reverser.

Clearly, the invention is not restricted to the above-described thrust reverser devices, but can be applied in other circumstances in which it is desired to deflect a flow through an angle at such a rate that separation would normally occur on one of the flow-guiding surfaces of the walls of the deflector.

According to the present invention there is provided a flow deflecting device having an inlet and an outlet for a flow, structure defining a surface which is shaped to deflect the flow from one direction to another in a curved path and which forms the outside extremity of the curved path, further structure at the inside extremity of the curved path and at which turbulence occurs in the flow as it passes around the curved path, said further structure comprising a plate which is dimensioned to extend into the turbulent region of the flow and a surface which together with the plate defines a recess open to the flow and in which, in operation, the flow causes a reduced pressure to delay the onset of separation of the flow from the surface of the further structure.

According to a feature of the present invention there is provided a translating cowl thrust reverser for a gas turbine engine in which the upstream side-wall of the thrust reverse aperture is provided with a plate adjacent the outlet of the aperture and extending in a downstream direction therefrom to such an extent that in operation, it lies only in the region of separated flow adjacent the upstream side-wall of the aperture.

The thrust reverser may additionally be provided with a plate adjacent the outlet of the aperture and which extends in an upstream direction from the downstream side-wall thereof.

In one particular form of the invention the gas turbine engine is a ducted fan gas turbine engine and the thrust reverser is arranged to reverse the flow through the fan duct of the engine.

In an alternative embodiment of the invention a gas turbine engine nozzle is provided with a deflector hood which substantially surrounds the gas efflux from the nozzle and bends through 90° to deflect the efflux downwardly for VTOL operation. In this case the nozzle wall on the inside of the bend is provided with a plate which extends into the turbulent flow region adjacent the outlet plane of the hood.

The invention will now be more particularly described, by way of example only, and with reference to the accompanying drawings in which:-

Figure 1:
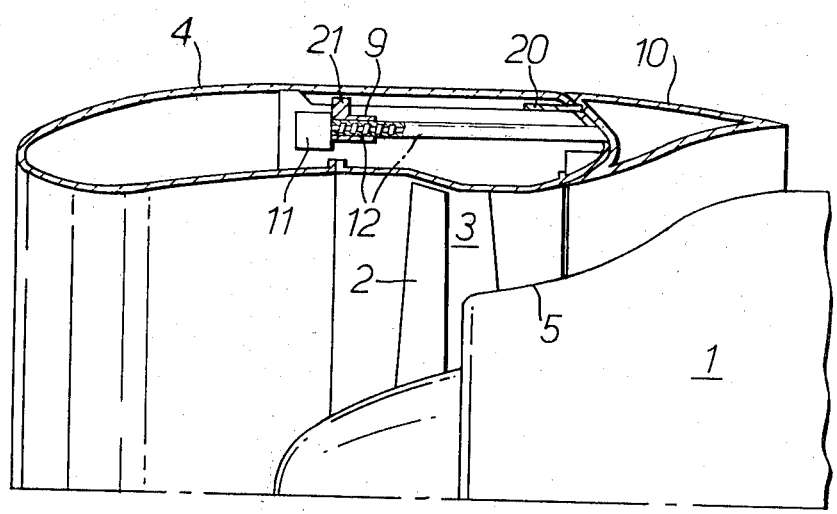
FIG. 1 is a half-section of the front portion of a ducted fan gas turbine engine having a translating cowl thrust reverser according to the present invention, and illustrated in the closed position.

Referring now to the drawings there is shown diagramatically a ducted fan gas turbine engine comprising a core engine 1 which is arranged to drive a fan 2. The fan is disposed in an annular fan duct 3 defined between a fan cowl 4 and the outer casing 5 of the core engine. At the downstream end of the fan cowl a portion 10 thereof is adapted to be moved axially by means of a conventional motor 11, screwjack 12, and nut 9, to open an annular or part-annular thrust reverse aperture 13 in the cowl. The thrust reverse aperture 13 has an inlet 14 which communicates with the fan duct 3, an outlet 15 to atmosphere, and upstream and downstream side-walls 18 and 19 respectively which form the inside and outside extremities of the curved flow path through the aperture.

Figure 2:
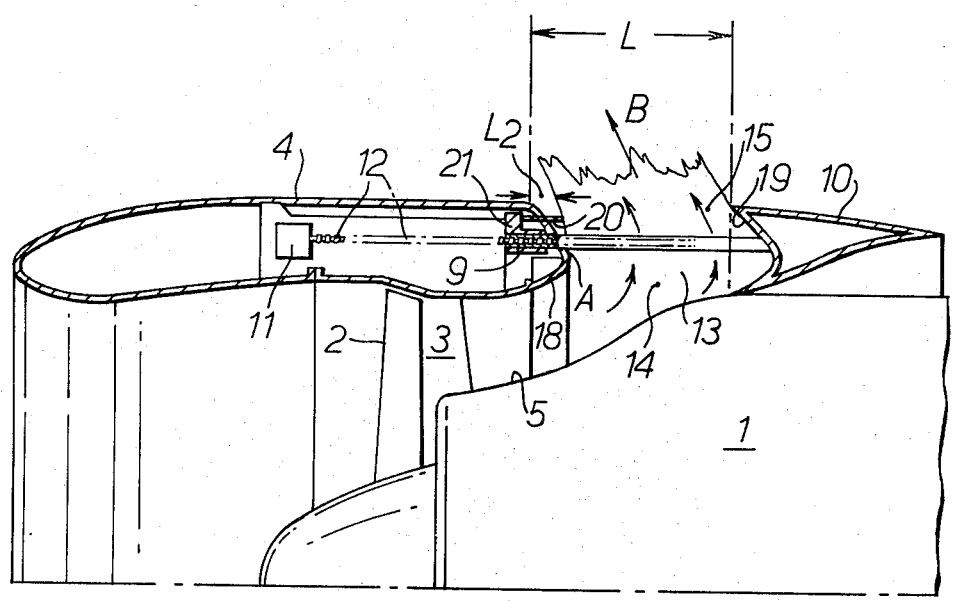
FIG. 2 is a similar view of the engine illustrating the thrust reverser in the open position.
Figure 4:
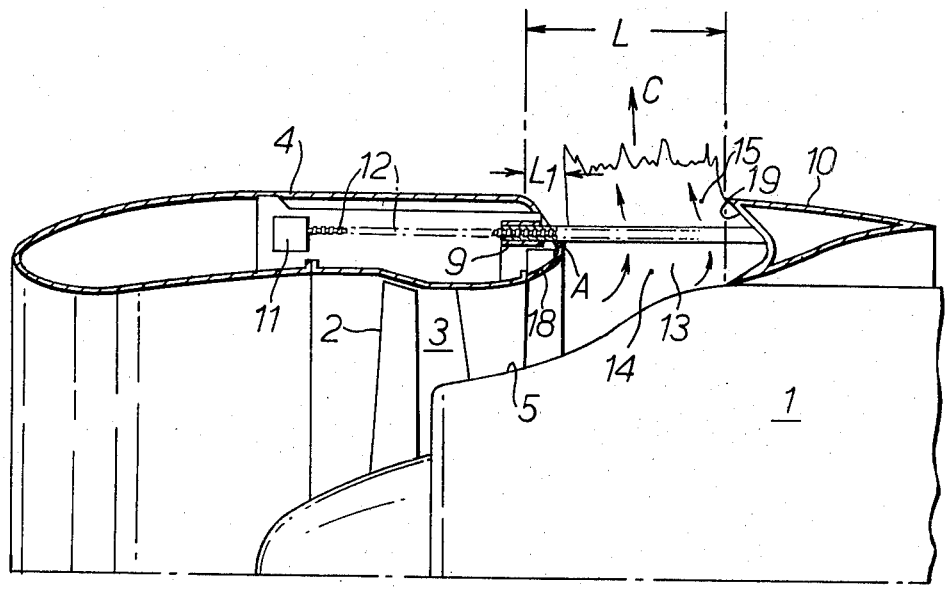
FIG. 4 is a view of part of a prior art thrust reverser showing the effect of flow separation from the upstream side-wall.

Thus far described the gas turbine engine and its thrust reverser may be of any conventional type and, as can be seen from FIG. 2, when the thrust reverser aperture is opened the fan duct is blocked by the radially inner surface of the downstream end of the fan cowl 20 approaching the radially outer surface 5 of the core engine 1, and the fan flow is diverted through the aperture and emerges with a forwardly directed component of velocity in the direction of arrow B to provide reverse thrust on the engine.

Figure 3:
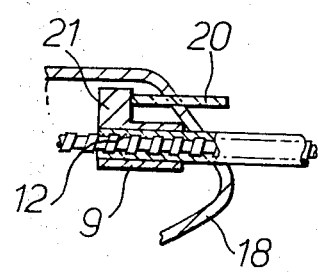
FIG. 3 is an enlarged fragmentary view of the upstream side-wall of FIG. 2.

In FIG. 3 there is illustrated the effect of the curvature of the upstream side-wall 18 being sufficiently great that flow separation occurs. The full area of the outlet of the aperture has a length L but as flow separation occurs at the point A on the upstream side-wall, the effective length of the outlet is reduced by an amount to L1 due to the higher pressure of the turbulent flow adjacent the side-wall pushing the flow away from the side-wall so that it emerges with a more nearly radial component of velocity in the direction indicated by the arrow C.

The provision of an annular end plate, which extends upstream from the downstream side-wall 19 at the outlet, can restore the forward component of velocity but further reduces the outlet flow area and the total performance of the thrust reverser is reduced.

To overcome the problem the present invention provides an annular plate 20 (FIG. 2) which extends downstream from the upstream side-wall 18 adjacent the outlet 15 into the turbulent flow in the separated flow region. The plate 20 and the upstream side-wall 18 together define a recess open to the flow in the turbulent region thereof, and the flow across the recess reduces the pressure in the turbulent region and provides a vortex behind the separation front. The effect is to bend the flow towards the upstream wall thus restoring to some extent the forward component of velocity in the flow and increasing the effective flow area by decreasing the distance $L_1$ to $L_2$.

An end plate on the downstream side-wall may also be used in combination with the plate 20 to further increase the forward component of velocity, and the lengths of the two plates can be optimized for maximum thrust reverse efficiency.

The word annular when used in relation to the plate 20 and the end plate on the downstream side-wall should be taken to include part-annular plates in the cases in which the aperture is not a complete annulus but one of an annular array. The plates should extend along the whole length of their respective side-walls.

Although, therefore, the provision of the plate 20 would appear to decrease the effective area of the outlet, it extends only into the turbulent flow, and by causing the flow to bend towards the upstream wall a net increase in flow area of the outlet is the result.

The plate 20 may be fixed and may enter a slot provided in the downstream side-wall when the aperture is closed, or may be retractable into a slot in the upstream side-wall and moved into the flow by any convenient means, for example as shown in FIGS. 1 and 2, by a collar 21 attached to the nut 9.

Although the invention has been described with reference to a ducted fan gas turbine engine it is applicable to any translating cowl thrust reverser in which the radial depth of the radially outer wall, or cowl, is sufficiently small that the curvature of the upstream side-wall produces flow separation. The plate 20 may be used with or without the end plate on the downstream side-wall.

The means for blocking the flow through the fan duct 3 need not be restricted to that shown. For example, as in other conventional thrust reverser systems flaps may be arranged to drop down from the radially outer wall into contact with the core engine outer casing to block the duct and direct the flow into the inlet of the aperture.

Another application for the invention is in a gas turbine engine nozzle which is provided with a deflector hood which substantially surrounds the nozzle at the nozzle exit plane. The hood extends downstream from the nozzle exit plane and bends through 90° to produce a vertically directed jet as its outlet. On the inside of the bend the flow curvature is very rapid and this results in a low discharge co-efficient at the exit plane of the hood. A plate attached to the nozzle on the inside of the bend adjacent the exit plane of the hood can assist in maintaining a lower pressure on the inside of the bend, thus turning the flow more quickly and improving the discharge co-efficient.

We claim:

1. A translating cowl thrust reverser for a ducted fan gas turbine engine comprising radially inner and outer walls defining a fan duct, means for translating a portion of the radially outer wall axially to open up in the radially outer wall an aperture which has an inlet communicating with the fan duct and an outlet communicating with atmosphere, means for simultaneously blocking the fan duct as the aperture is opened and for directing flow from the fan duct into the inlet of the aperture, the aperture having upstream and downstream side-walls which are shaped to give the flow through the aperture a forward component of velocity from the outlet thereof, and a substantially axially extending at least part-annular plate extending in a downstream direction from the upstream side-wall of the aperture only into a turbulent region of the flow and terminating upstream of the downstream extent of the upstream side-wall and defining with the upstream side-wall an annular recess open to the flow and in which, in operation, the flow causes a reduced pressure to delay the onset of separation from the upstream side-wall.

2. A translating cowl thrust reverser as claimed in claim 1 and in which the plate is fixed adjacent to the upstream portion of the radially outer wall, and the downstream portion is provided with a slot for receiving the plate when the aperture is closed.

3. A translating cowl thrust reverser as claimed in claim 1 and in which means are provided to translate the plate into its operating position as the aperture is being opened, the plate being received in a slot in the upstream portion of the radially outer wall when the aperture is closed.

* * * * *